United States Patent [19]

Clausen et al.

[11] Patent Number: 4,900,869

[45] Date of Patent: Feb. 13, 1990

[54] PROCESS FOR THE PRODUCTION OF 4-[ETHYL-(2'-HYDROXYETHYL)-AMINO]-1-[(2'-HYDROXYETHYL)-AMINO]-2-NITROBENZENE

[75] Inventors: Thomas Clausen, Alsbach; Isolde Löwe, Bensheim, both of Fed. Rep. of Germany

[73] Assignee: Aktiengesellschaft Wella, Darmstadt, Fed. Rep. of Germany

[21] Appl. No.: 120,213

[22] Filed: Nov. 6, 1987

Related U.S. Application Data

[62] Division of Ser. No. 938,787, Dec. 5, 1986, abandoned.

[30] Foreign Application Priority Data

Dec. 5, 1985 [DE] Fed. Rep. of Germany ....... 3543020

[51] Int. Cl.$^4$ .................. C07C 85/04; C07C 87/60
[52] U.S. Cl. ..................... 564/441; 564/404
[58] Field of Search ................. 564/404, 441

[56] References Cited

U.S. PATENT DOCUMENTS

| | | | |
|---|---|---|---|
| 3,274,249 | 9/1966 | Brunner et al. | 564/404 |
| 3,629,330 | 12/1971 | Brody et al. | 564/441 |
| 4,666,453 | 5/1987 | Junino et al. | 564/441 |
| 4,736,067 | 4/1988 | Bugaut et al. | 564/441 |

FOREIGN PATENT DOCUMENTS

| | | | |
|---|---|---|---|
| 273072 | 7/1969 | Austria . | |
| 1768999 | 8/1971 | Fed. Rep. of Germany . | |
| 2924089 | 1/1981 | Fed. Rep. of Germany . | |
| 100039 | 9/1974 | Japan | 564/404 |
| 867220 | 5/1961 | United Kingdom . | |
| 955743 | 4/1964 | United Kingdom . | |

Primary Examiner—Glennon H. Hollrah
Assistant Examiner—Peter G. O'Sullivan
Attorney, Agent, or Firm—Michael J. Striker

[57] ABSTRACT

A process is disclosed for the production of 4-[ethyl-(2'-hydroxyethyl)-amino]-1-[(2'-hydroxyethyl)-amino]-2-nitrobenzene, by means of a two-stage technique proceeding from the reaction product of 1,4-diamino-2-nitrobenzene with chloroformic acid chloroethyl ester, or by means of a multiple-stage technique which is based upon an improved process for the production of the pre-stage 4-ethylamino-1-[(2'-hydroxyethyl)-amino]-2-nitrobenzene through sulfuric acid splitting off of 4-(N-ethylarylsulfonamido)-1-[(2'-hydroxyethyl)-amino]-2-nitrobenzene.

5 Claims, No Drawings

PROCESS FOR THE PRODUCTION OF 4-[ETHYL-(2'-HYDROXYETHYL)-AMINO]-1-[(2'-HYDROXYETHYL)-AMINO]-2-NITROBENZENE

This is a division of application Ser. No. 938,787, filed Dec. 5, 1986, now abandoned.

BACKGROUND OF THE INVENTION

The present invention concerns processes for the production of 4-[ethyl-(2'-hydroxyethyl)-amino]-1-[(2'-hydroxyethyl)-amino]-2-nitro-benzene (I),

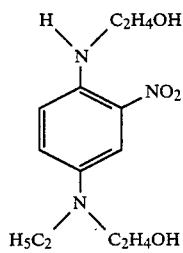

The compound of formula (I) is a blue dye, which can be employed in hair coloring compositions based upon its outstanding coloring characteristics as well as its very good physiological compatibility.

Several techniques are already known for the production of substituted nitro-p-phenylene diamine compounds of the type of formula (I). However, they are unsatisfactory from many points of view. It has thus been suggested, for example, to produce certain nitro-p-phenylene diamines by means of nitrification of the corresponding p-phenylene diamine derivative. With these processes, however, the hydrogen atoms of the amino group must be protected before the nitrification, by means of acetylation, formylation, tosylation, oxalylation or the production of urethane. After the following nitrification, an additional hydrolysis stage is necessary for the splitting off of these protective groups. The result is that these processes are complicated and time-consuming, and lead to the desired nitro-p-phenylene diamine derivatives only in low total yields, whereby the processes are unsuitable also from the economical viewpoint. It is moreover known, from GB-PS 867 220 and the work of J. F. Corbett and A. G. Fooks, J. Chem. Soc. (C), pages 1136 to 1138, 1967, that N-1-mono-substituted 2-nitro-p-phenylene diamine cannot be produced by means of direct nitrification of p-phenylene diamines.

According to another known process, 2,4-dinitro-aniline is catalytically reduced to 2-nitro-p-phenylene diamine (see, for example, GB-PS 955 743). In connection therewith, the isomer 4-nitro-o-phenylene diamine can form during the reduction, separation of which is difficult and time-consuming.

A process is described in DE-PS 1 768 999 which avoids an alkylation in position N-1. However, this process does not make possible the production of compounds which possess two different alkyl or hydroxyalkyl groups in the N-4 position. Moreover, the exchange reaction described in this reference proceeds with satisfactory yields only in the case of the 1-fluoro-compound, but not for the case of the corresponding chloro-compound.

SUMMARY OF THE INVENTION

It is therefore an object according to the present invention to make available a process which makes possible a simple and economical production of the compound of formula (I). Surprisingly, two new processes for the production of compound (I) have been discovered, with which this dye is obtained in high yields and in very pure form.

Accordingly, the subject of the present invention includes two processes for the production of the dye (I), whereby the process designated A, which leads to the desired compound through a two-stage reaction in the manner described below, is particularly advantageous.

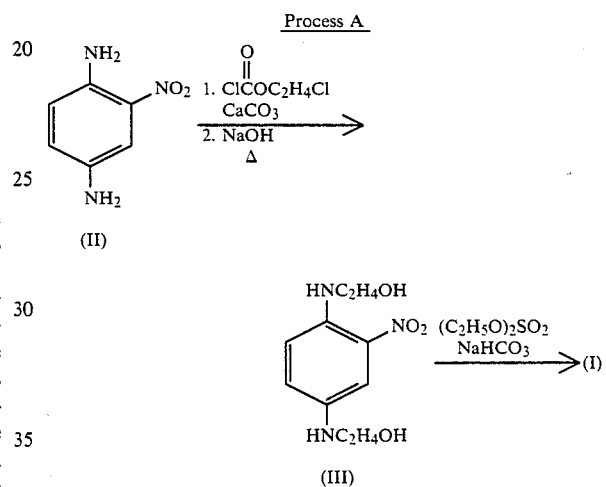

With the process A according to the present invention, one reacts 1,4-diamino-2-nitro-benzene with chloroformic acid chloroethyl ester in the presence of calcium carbonate. Then, the reaction product is alkalinically hydrolysed, and the 1,4-bis-[(2'-hydroxyethyl)-amino]-2-nitro-benzene obtained after neutralization is alkylated with diethyl sulfate into the end product (I).

Whether or not, as described above, the alkylation of compounds of type (II) rarely proceeds completely at position N-1, a simultaneous monohydroxyethylation at positions N-1 and N-4 can be obtained without problem by means of the described reaction of 1,4-diamino-2-nitro-benzene with chloroformic acid chloroethyl ester. The technique of monohydroxyethylation with chloroformic acid chloroethyl ester is indeed already known. (See, for example, DE-OS 29 24 089 and AT-PS 273 072.) However, the problem-free simultaneous hydroxyethylation at positions N-1 and N-4, proceeding in high yield, was not to be expected. This result is all the more surprising, inasmuch a manner of operation according to DE-OS 29 24 089 leads to the desired intermediate product (III) only in poor yields.

The basis for this is that with a manner of operation according to DE-OS 29 24 089, the intermediately formed carbamate (IV) produces the oxazolidon (V) in the course of the alkaline hydrolysis.

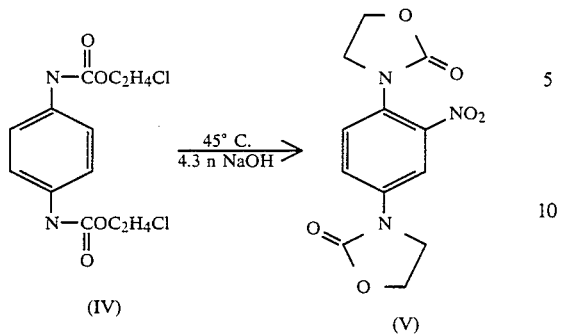

This oxazolidon (V) is nearly insoluble in all customary solvents, so that for splitting off of the oxazolidon ring, conditions must be employed which lead to a considerable formation of by-products, that is, to low yields of (III). For this reason, the formation of the oxazolidon (V) must be unconditionally avoided.

This is managed by means of the manner of operation according to the present invention, with which an aqueous 5 to 20% alkali hydroxide solution, preferably a 10% caustic soda, is employed for the alkaline hydrolysis. Herewith, the total amount of alkali hydroxide should, however, come to at least the fourfold molar amount of the employed pre-stage (II). The reaction temperature required for formation of (III) amounts to between 65° and 80° C., preferably 70° C. With lower or higher temperatures, the reaction proceeds with poorer yields, and formation of (V) or decomposition of (III). Upon employment of the preferred reaction conditions, the reaction period amounts to about 20 minutes.

By means of the above described manner of operation, a production of (III) in high yields is made possible, since the extremely difficulty soluble oxazolidon (V) is neither isolated nor produced intermediately in such concdntrations that solubility problems occur.

The present invention also encompasses a process (i.e. process B) which, in the manner described below, proceeds through a sulfonamide of the 4-chloro-3-nitro-aniline.

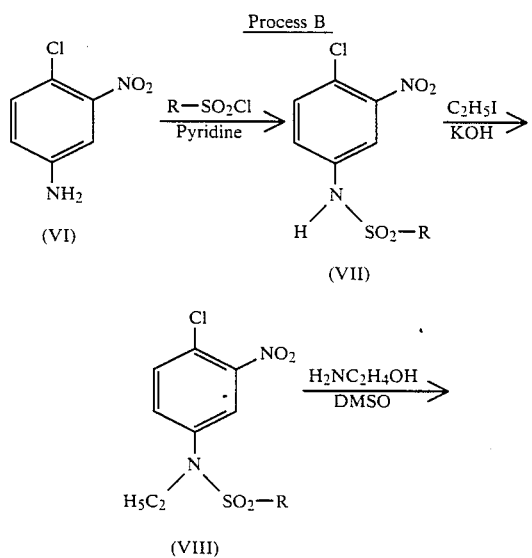

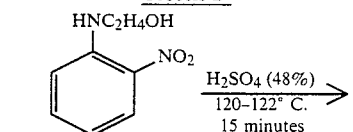

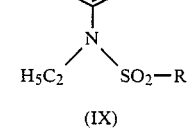

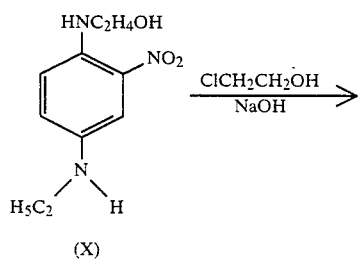

R = aryl (particularly phenyl and tolyl)

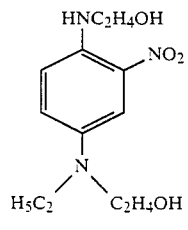

With process B according to the present invention, the primary amino group in the 4-amino-1-chloro-2-nitro-benzene (VI) is initially reacted with an aryl sulfonic acid chloride, preferably a benzene- or toluene sulfonic acid chloride, into the corresponding sulfonamide (VII). Then, the sulfonamide (VII) is alkylated with ethyl iodide into (VIII) and converted with monoethanolamine into the 4-(N-ethyl-arylsulfonamido)-1-[(2'-hydroxyethyl)-amino]-2-nitro-benzene (IX). Subsequently, the arylsulfonyl group is split off from (IX) with sulfuric acid, and the obtained 4-ethylamino-1-[(2'-hydroxyethyl)-amino]-2-nitro-benzene (X) is converted with 2-chloroethanol into the end product (I).

The splitting off of the aryl sulfonyl group from the sulfonamide (IX) is problemmatical with this process. On account of the great stability of (IX), the splitting normally requires such drastic reaction conditions that the formed, comparatively labile, 4-ethylamino-1-[(2'-hydroxyethyl)-amino]-2-nitro-benzene (X) is very quickly decomposed. Surprisingly, however, it has now been discovered that with precise adjustment of the reaction conditions according to the present invention, particularly the sulfuric acid concentration, the reaction temperature and the reaction period, the desired compound (X) is obtained in good yields by means of the cleavage of (IX) with sulfuric acid.

According to the present invention, the splitting off of the sulfonyl groups from (IX) follows with 45 to 70% sulfuric acid, preferably 48% sulfuric acid, at a temperature from 95° to 130° C., preferably 120° to 122° C. If a sulfuric acid with a higher concentration than the preferred concentration is employed, then the optimal reaction temperature is correspondingly lowered. Conversely, with the use of a sulfuric acid having a lower concentration, a higher reaction temperature is necessary. Thus, for example, with comparable yields, the reaction temperature amounts to 95° C. upon employment of a 70% sulfuric acid, 120° to 122° C. upon employment of a 48% sulfuric acid, and 130° C. upon employment of a 45% sulfuric acid. The optimal reaction period depends upon the sulfuric acid concentration and the reaction temperature. With the preferred reaction conditions, i.e. 120° to 122° C./48% sulfuric acid, it amounts to 15 minutes. Upon employment of 70% sulfuric acid and a reaction temperature of 95° C., in contrast, the best yields are obtained with a reaction period of 25 minutes.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

PROCESS A

1st Stage:
1,4-bis-[(2'-hydroxyethyl)-amino]-2-nitro-benzene 153 g (1 mol) of 1,4-diamino-2-nitro-benzene and 150 g (1.5 mol) of calcium carbonate are heated in 400 ml dioxan on a boiling water bath. 250 ml (2.4 mol) chloroformic acid chloroethyl ester are then dripped in. Subsequently, the reaction mixture is heated until both amino groups have been converted, according to thin layer chromatogram (silica gel prepared plate, 0.25 mm, Fa. Merck; flowing agent methylene chloride with 10 percent methanol; detection by means of spraying with a 1% solution of p-dimethylamino-benzaldehyde in 20% hydrochloric acid: the monoacyl compound colors orange, whereas the diacyl compound does not react). About 3 hours are required for this. The reaction mixture is then cast onto ice and the excess calcium carbonate is decomposed with hydrochloric acid. Then, it is evacuated in a vacuum and washed thoroughly with water until neutral reaction of the substance. The yield is nearly quantitative.

For hydrolysis, 250 g of the moist β-chloroethyl ester are reacted with 1400 ml cold 10% caustic soda, and heated under stirring to 70° C. (interior temperature). This temperature is maintained for 20 minutes, after which the reaction mixture is allowed to cool down, followed by reaction with acetic acid (with strong $CO_2$-development), until a sediment begins to deposit. After allowing to stand for several hours, the deposited compound is evacuated in a vacuum.

Melting point: 100° C.

Yield: 174.8 g (72.5% of theoretical amount, relative to the employed amount of 1,4-diamino-2-nitro-benzene).

The 1,4-bis-[(2'-hydroxyethyl)-amino]-2-nitro-benzene can be further purified by means of recrystallization from acetonitrile.

2nd Stage:
4-[ethyl-(2'-hydroxyethyl)-amino]-1-[(2'-hydroxyethyl)-amino]-2-nitro-benzene A mixture of 56 g (0.23 mol) 1,4-bis-[(2'-hydroxyethyl)-amino]-2-nitro-benzene from stage 1, 84 g (1 mol) sodium hydrogen carbonate and 120 ml water is heated to 80° C. Then, 50 ml (58.87 g=0.382 mol) of diethyl sulfate are added thereto. A strong carbon dioxide development occurs herewith (bubble recorder). When this has finished, another 10 ml (15.42 g =0.077 mol) of diethyl sulfate are added, and after the completed reaction, the bath temperature is increased for 1 hour to 140° C., in order to decompose excess diethyl sulfate.

After cooling down, the reaction mixture is extracted with ethyl acetate. The combined ethyl acetate phases are dried across sodium sulfate, and the solvent is distilled off in a vacuum. For further purification, the residue is dissolved in 150 ml isopropanol, and 18 ml concentrated hydrochloric acid are then added. The precipitated yellow hydrochloride is sucked off in a vacuum, washed with isopropanol, and then dried.

Yield: 41 g (58.3% of theoretical amount, relative to the employed of the compound from Stage 1).

For production of the free base, 41 g hydrochloride are dissolved in water and reacted with ammonia. The solution is then extracted with ethyl acetate. After evaporation of the ethyl acetate, the base crystallizes out and can be recrystallized from benzene.

Melting poit: 62° C.

Yield: 27 g (75% of theoretical amount).

PROCESS B

1st Stage: 1-chloro-2-nitro-4-benzenesulfonamido-benzene 172.5 g (1 mol) of 4-amino-1-chloro-2-nitro-benzene are dissolved in 400 ml pyridine with heating. 193 g (1.09 mol) of benzene sulfochloride are slowly added dropwise, followed by heating for 1 hour at 120° C. (bath temperature). Subsequently, the solution is cast onto ice, and the 1-chloro-2-nitro-4-benzene-sulfonamido-benzene is evacuated in a vacuum. The compound is recrystallized from ethanol/water.

Melting point: 153° C.

Yield: 298 g (95% of theoretical amount).

2nd Stage:
1-chloro-2-nitro-4-(N-ethyl-benzene-sulfonamido)-benzene 31.25 g (0.1 mol) of the compound from Stage 1 are dissolved with 13.5 g (0.24 mol) potassium hydroxide in 100 ml water, and then heated to 70° C. Then 31 g (0.2 mol) of iodoethane are very slowly added dropwise, over 2 hours. After this period, the ethyl compound begins to deposit out. Heating is continued for a further 2 hours, after which the reaction mixture is allowed to cool down. After evacuation in a vacuum, the product is recrystallized from ethanol/water.

Melting point: 128° C.

Yield: 23 g (68% of theoretical amount, relative to the employed amount of the compound from Stage 1).

3rd Stage:
4-(N-ethyl-benzenesulfonamido)-1-[(2'-hydroxyethyl)-amino]-2-nitro-benzene 23 g (0.068 mol) of the chloro-compound from Stage 2 are stirred in 10 ml dimethylsulfoxide with 13.5 g (0.22 mol) monoethanolamino at a temperature of 100° C. for 2 hours.

The solution is then cast onto ice, and the sulfonamide is evacuated in a vacuum. After the recrystallization from ethanol/water, the orange product melts at a temperature of 105° C.

Yield: 22.5 g (91.5% of theoretical amount, relative to the employed amount of the chloro-compound from Stage 2).

4th Stage:
4-ethylamino-1-[(2'-hydroxyethyl)-amino]-2-nitro-benzene 14 g (0.038 mol) of the sulfonamide from Stage 3 are heated in 25 ml of 48% sulfuric acid for a period of 15 minutes to a temperature of 120° to 122° C. (interior temperature). Then, the mixture is allowed to cool down, and the free base is precipitated by means of neutralization with ammonia. The free base is then evacuated in a vacuum while after-washing with a little water.

After drying, the yield amounts to 6.8 g (77.3% of the theoretical amount, relative to the employed amount of sulfonamide from Stage 3). The red crystals, after re-crystallization from toluene, melt at 96° to 98° C.

5th Stage:
4-[ethyl-(2'-hydroxyethyl)-amino]-1-[(2'-hydroxyethyl)-amino]-2-nitro-benzene 6.8 g (0.027 mol) 4-ethylamino-1-[(2'-hydroxyethyl)-amino]-2-nitro-benzene from Stage 4 are dissolved in 6 g (0.075 mol) of 2-chloro-ethanol. 3 g (0.075 mol) of sodium hydroxide in 30 ml water are very slowly added dropwise to this solution at a temperature of 120° C., with stirring. After a reaction period of 2 hours, the mixture is reacted with another 6 g (0.075 mol) 2-chloro-ethanol and 3 g (0.075 mol) sodium hydroxide in 30 ml water, as described above. The reaction is finished after 8 hours. The mixture is then extracted with ethyl acetate and the combined ethyl acetate phases are treated as described in Process A (2nd Stage).

Melting point: 62° C.

Yield: 5.1 g (62.7% of theoretical amount, relative to the employed amount of 4-ethylamino-1-[(2'-hydroxyethyl)-amino]-2-nitro-benzene).

All percentages set forth in this application represent percent by weight.

It will be understood that each of the elements described above, or two or more together, may also find a useful application in other types of processes differing from the types described above.

While the invention has been illustrated and described as embodied in processes for the production of 4-[ethyl-(2'-hydroxyethyl)-amino]-1-[(2'-hydroxyethyl)-amino]-2-nitro-benzene, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Process for the production of 4-[ethyl-(2'-hydroxyethyl)-amino]-1-[(2'-hydroxyethyl)-amino]-2-nitrobenzene, comprising converting the primary amino group in 4-amino-1-chloro-2-nitrobenzene with an aryl sulfonic acid chloride into the corresponding sulfonamide, alkylating said sulfonamide with ethyl iodide, converting the reaction product with monoethanolamine into the 4-(N-ethyl-aryl-sulfonamido)-1-[(2'-hydroxyethyl)-amino]-2-nitrobenzene, then splitting off the aryl sulfonyl group with sulfuric acid, and reacting the obtained 4-ethylamino-1-[(2'-hydroxyethyl)-amino]-2-nitrobenzene with 2-chloroethanol into 4-[ethyl-(2'-hydroxyethyl)-amino]-1-[(2'-hydroxyethyl)-amino]-2-nitrobenzene.

2. The process according to claim 1, wherein said splitting off the aryl sulfonyl group is performed in 45 to 70% sulfuric acid.

3. The process according to claim 1, wherein said splitting off the aryl sulfonyl group is performed in 48% sulfuric acid.

4. The process according to claim 1, wherein said splitting off the aryl sulfonyl group is performed at a temperature from 95° to 130° C.

5. The process according to claim 1, wherein said splitting off the aryl sulfonyl group is performed at a temperature from 120° to 122° C.

* * * * *